May 6, 1952   R. M. MAGNUSON   2,595,592
PACKING STRUCTURE
Filed Aug. 26, 1949

INVENTOR
ROY M. MAGNUSON
BY Harper Allen
ATTORNEY

Patented May 6, 1952

2,595,592

UNITED STATES PATENT OFFICE 2,595,592

PACKING STRUCTURE

Roy M. Magnuson, Campbell, Calif.

Application August 26, 1949, Serial No. 112,611

5 Claims. (Cl. 309—3)

This invention relates to packing structures for high pressure spray pumps employing reciprocating pistons and is concerned more particularly with a packing structure of the above type which is simple in its construction and employs readily replaced sealing elements, both with respect to the pump cylinder and with respect to the pump piston.

The above and other objects of the invention will be apparent from the following description of a preferred embodiment of the invention, as illustrated in the accompanying drawings, in which.

Figure 1:
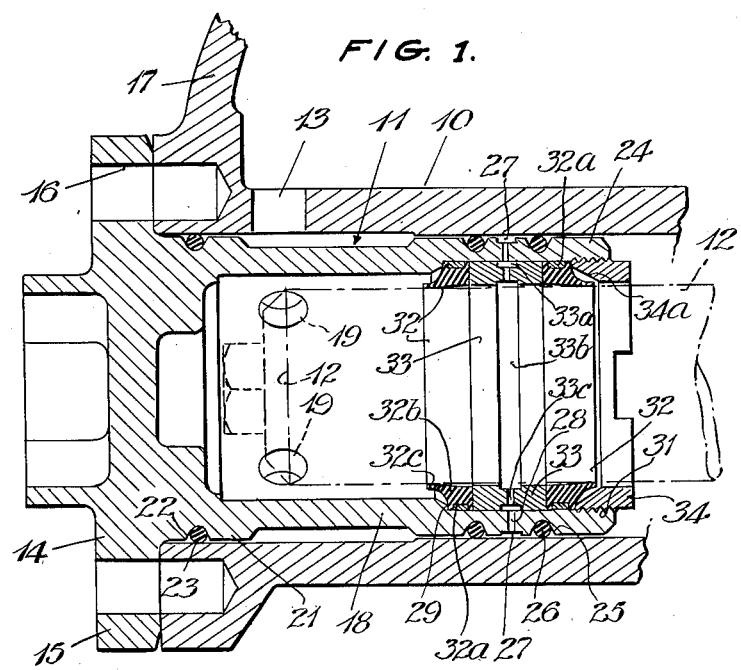
Figure 1 is a vertical sectional view illustrating the packing structure in the pump cylinder.
Figure 2:
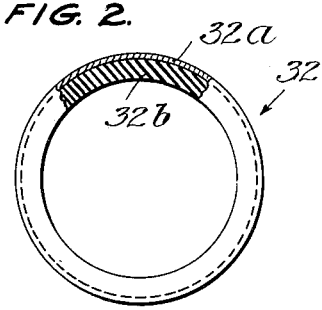
Figure 2 is an elevational view of one of the packing rings employed in the packing structure.
Figure 3:
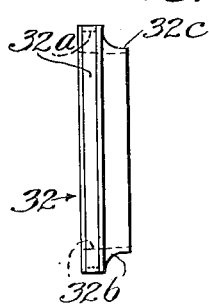
Figure 3 is a side elevational view of this packing ring.

The invention as disclosed herein is an improvement on the packing structure disclosed in my co-pending application, Serial 697,066, filed September 14, 1946, now Patent No. 2,563,949 issued August 14, 1951, and reference is had to the above identified application for a disclosure of the pump structure not specifically described herein.

High pressure spray pumps of the type with which the present invention is especially useful include a cylinder illustrated herein at 10, a packing structure indicated generally at 11 which is disposed within the cylinder and within which a reciprocating piston 12 moves. Suitable inlet and outlet openings are provided to the space within the cylinder 10, one of these being indicated at 13.

The packing structure as disclosed herein is preferably made partially integral with the cylinder head 14, on which the remaining portions of the packing structure are also mounted, so that the cylinder head and packing structure are inserted and removed from the pump as a unit. The cylinder head 14 is provided with a flange 15 having respective apertures 16 for mounting on the wall 17 of the pump by means of suitable fastening studs. The head 14 is also provided with a sleeve extension 18 extending inwardly within the cylinder 10 in spaced relation to the wall thereof. This sleeve extension 18 is provided with a plurality of apertures 19 therein providing for passage of liquid from within the sleeve to the remaining cylinder space. Immediately adjacent the flanged portion 15 of the cylinder head there is provided a cylindrical portion 21 having a V-shaped O-ring groove 22 machined therein within which a resilient ring 23 of conventional circular cross-section construction is seated for sealing engagement with the inner wall of the cylinder 10. The sleeve extension 18 is reduced in diameter adjacent the portion 21 thereof for passage of liquid and has a portion 24 of greater diameter at its end. The portion 24 with a pair of annular O-ring grooves 25 in which respective sealing rings 26 are seated. Intermediate the grooves 25 there is an annular groove 27 for lubricant which is connected with the interior of the extension by one or more drilled passages 28. A conventional grease fitting (not shown) is provided for introducing lubricant to the groove 27.

The internal surface of sleeve extension 18 has a machined section extending inwardly from its end to a shoulder 29, a threaded portion 31 being provided at the outer end of this machined surface. Seated within this machined surface and held against the shoulder 29 are respective similar sealing rings 32 with a spacer ring 33 interposed therebetween, these parts being held in place by a lock nut 34.

Each sealing ring 32 includes an outer support ring 32a of metal such as brass having bonded thereto a sealing ring portion of suitable resilient material such as synthetic rubber including a body portion 32b and an axially extending lip 32c which tapers inwardly to a smaller radius than the body portion 32b. Preferably the body portion 32b extends to either side of the ring 32a to be interposed between this ring and the shoulder 29 and the spacing ring 33. The lips 32c of the ring is responsive to pressure to effect its sealing engagement with the piston 12.

The spacing ring 33 is of some suitable soft bearing metal such as brass and has respective outer and inner oil grooves 33a and 33b machined therein and joined by drilled passages 33c. The outer groove 33a is in registry with the respective oil passages 28. Preferably the inner diameter of the spacer ring 33 is slightly greater than the inner diameter of the lips 32c of the packing rings so that the piston 12 is slidable freely therewithin with a floating mounting within the packing rings 32. The retaining nut 34 is provided with a recessed inner face at 34a to provide clearance for the lip 32c of the adjacent packing ring.

In operation, the respective sealing rings 23 and 26 seal the outer surface of the packing structure with respect to the suction and pressure cycles of the cylinder while the packing rings 32 similarly seal with respect to the piston 12.

The above structure lends itself to quick assembly and disassembly of the cylinder head and packing structure with respect to the cylinder and easy change of the sealing elements per se of the packing structure by simple removal of the retaining nut 34.

While I have shown and described a preferred embodiment of the invention it will be apparent that the invention is capable of variation and modification from the form shown so that its scope should be limited only by the scope of the claims appended hereto.

I claim:

1. A pump packing structure comprising a cylinder head having means for attachment to a pump cylinder in sealed relation therewith, a cylindrical extension carried by said head to extend within the cylinder and having a pair of spaced-apart external sealing ring grooves and a third groove therebetween, said extension having an open end, respective sealing rings seated in said sealing ring grooves, an internal annular seat formed in said extension and spaced from the open end thereof beyond said external grooves, a pressure-responsive sealing ring engaging said seat and having a resilient sealing lip extending toward said head, a spacing ring engaging said sealing ring, a second pressure-responsive sealing ring engaging said spacing ring and having a resilient sealing lip extending away from said cylinder head, and a lock nut threaded into said extension and engaging said second pressure-responsive sealing ring.

2. A pump packing structure comprising a cylinder head having means for attachment to a pump cylinder in sealed relation therewith, a cylindrical extension carried by said head to extend within the cylinder and having a pair of spaced-apart external sealing ring grooves and a third groove therebetween, said extension having an open end, respective sealing rings seated in said sealing ring grooves, an internal annular seat formed in said extension and spaced from the open end thereof beyond said external grooves, a pressure-responsive sealing ring engaging said seat and having a resilient sealing lip extending toward said head, a spacing ring engaging said sealing ring and having communicating external and internal oil grooves in alignment with said third external groove of said extension, a second pressure-responsive sealing ring engaging said spacing ring and having a resilient sealing lip extending away from said cylinder head, and a lock nut threaded into said extension and engaging said second pressure-responsive sealing ring.

3. A pump packing structure comprising a cylinder head having means for attachment to a pump cylinder in sealed relation therewith, a cylindrical extension carried by said head to extend within the cylinder, and having an open end detachably mounted annular sealing means carried externally of said extension for engagement within the pump cylinder, an internal seat formed in said extension and spaced from the open end thereof beyond said sealing means, a pressure-responsive sealing ring engaging said seat and having a sealing lip extending toward said head, a spacing ring engaging said sealing ring, a second pressure-responsive sealing ring engaging said spacer and having a sealing lip extending away from said cylinder head, and a lock nut threaded into said extension and engaging said second pressure-responsive sealing ring.

4. A pump packing structure comprising a cylinder head having means for attachment to a pump cylinder in sealed relation therewith, a cylindrical extension carried by said head to extend within the cylinder, detachably mounted annular sealing means carried externally of said extension for engagement within the cylinder, and a pair of detachably mounted pressure-responsive sealing rings carried within said extension having respective oppositely facing sealing lips for engagement with the pump piston.

5. A pump packing structure comprising a cylinder head having means for attachment to a pump cylinder in sealed relation therewith, a cylindrical extension carried by said head to extend within the cylinder, a pair of detachably mounted annular sealing elements carried externally of said extension in spaced apart relation for engagement within the pump cylinder, a second pair of detachably mounted annular sealing elements carried internally of said extension in spaced apart relation for engagement with the pump piston, and oil passage means in said extension between each of said respective pairs of sealing elements.

ROY M. MAGNUSON.

REFERENCES CITED

The following references are of record in the file of this patent:

UNITED STATES PATENTS

| Number | Name | Date |
|---|---|---|
| 767,526 | Paulson | Aug. 16, 1904 |
| 1,584,843 | Carroll | May 18, 1926 |
| 2,045,024 | Renken et al. | June 23, 1936 |
| 2,259,432 | Failing et al. | Oct. 14, 1941 |
| 2,492,006 | Raybould | Dec. 20, 1949 |

FOREIGN PATENTS

| Number | Country | Date |
|---|---|---|
| 272,643 | Italy | Mar. 15, 1930 |